A. J. PAIGE.

INTERNAL COMBUSTION ENGINE.

APPLICATION FILED APR. 16, 1917.

Reissued Aug. 28, 1917.

14,347.

5 SHEETS—SHEET 1.

Inventor
Arthur J. Paige

By Hoodr Schley
Attorneys

A. J. PAIGE.

INTERNAL COMBUSTION ENGINE.

APPLICATION FILED APR. 16, 1917.

Reissued Aug. 28, 1917.

14,347.

5 SHEETS—SHEET 2.

Inventor
Arthur J. Paige

By Hoodschley
Attorneys.

A. J. PAIGE.

INTERNAL COMBUSTION ENGINE.

APPLICATION FILED APR. 16, 1917.

Reissued Aug. 28, 1917.

14,347.

5 SHEETS—SHEET 3.

Inventor
Arthur J. Paige

By Hoodr Schley
Attorneys

A. J. PAIGE.

INTERNAL COMBUSTION ENGINE.

APPLICATION FILED APR. 16, 1917.

Reissued Aug. 28, 1917.

14,347

5 SHEETS—SHEET 4.

Inventor
Arthur J. Paige,

By Hoode & Schley
Attorneys.

A. J. PAIGE.

INTERNAL COMBUSTION ENGINE.

APPLICATION FILED APR. 16, 1917.

Reissued Aug. 28, 1917.

14,347.

5 SHEETS—SHEET 5.

Inventor
Arthur J. Paige

By Hoover & Schley
Attorneys

UNITED STATES PATENT OFFICE.

ARTHUR J. PAIGE, OF DETROIT, MICHIGAN.

INTERNAL-COMBUSTION ENGINE.

14,347. Specification of Reissued Letters Patent. Reissued Aug. 28, 1917.

Original No. 1,216,160, dated February 12, 1917, Serial No. 777,446, filed July 5, 1913. Application for reissue filed April 16, 1917. Serial No. 162,573.

*To all whom it may concern:*

Be it known that I, ARTHUR J. PAIGE, a citizen of the United States, residing in Detroit, county of Wayne, State of Michigan, have invented new and useful Improvements in Internal-Combustion Engines, of which the following is a specification.

The object of my invention is to produce a compact motor, preferably of the internal combustion type, having a high power per unit of size and weight, of the general type illustrated in my prior Patent No. 848,845, the construction being such as to be readily produced and easily maintained.

Figure 1:
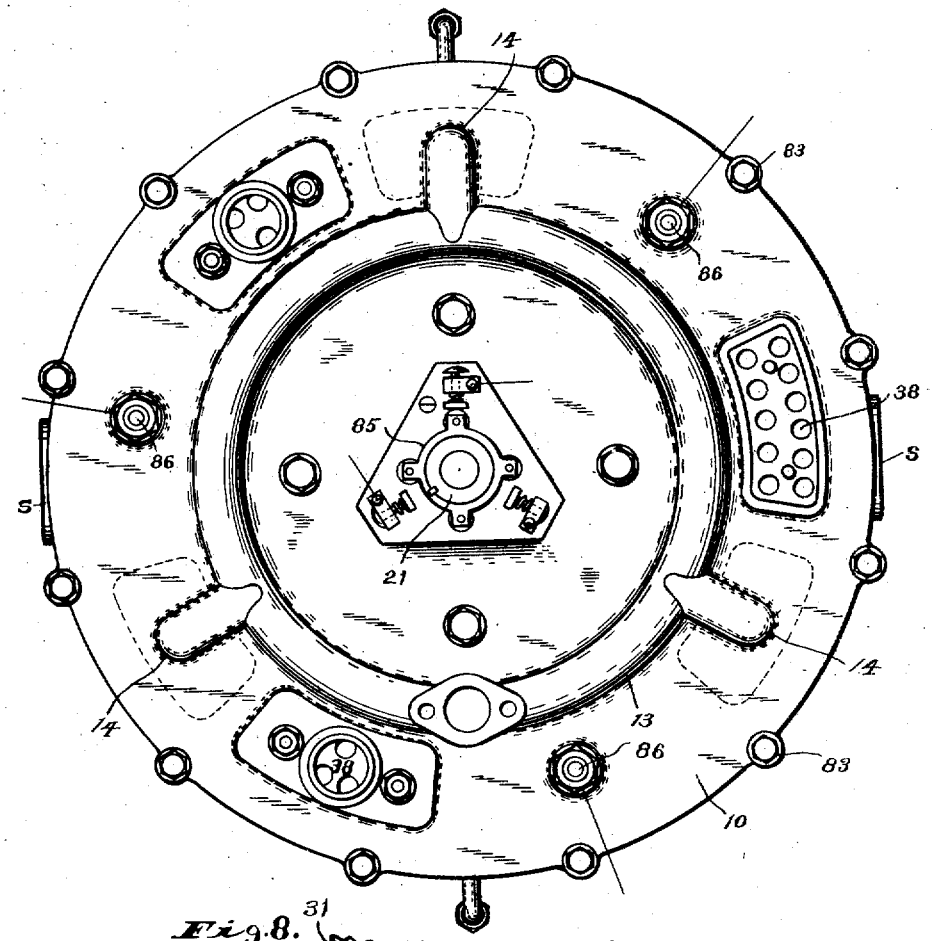
Figure 8:
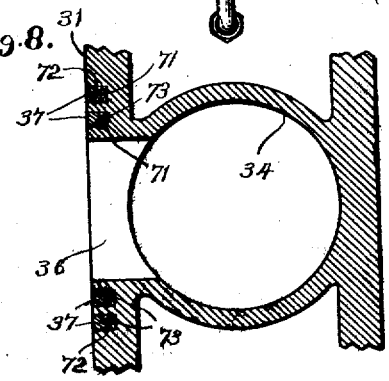
Figure 2:
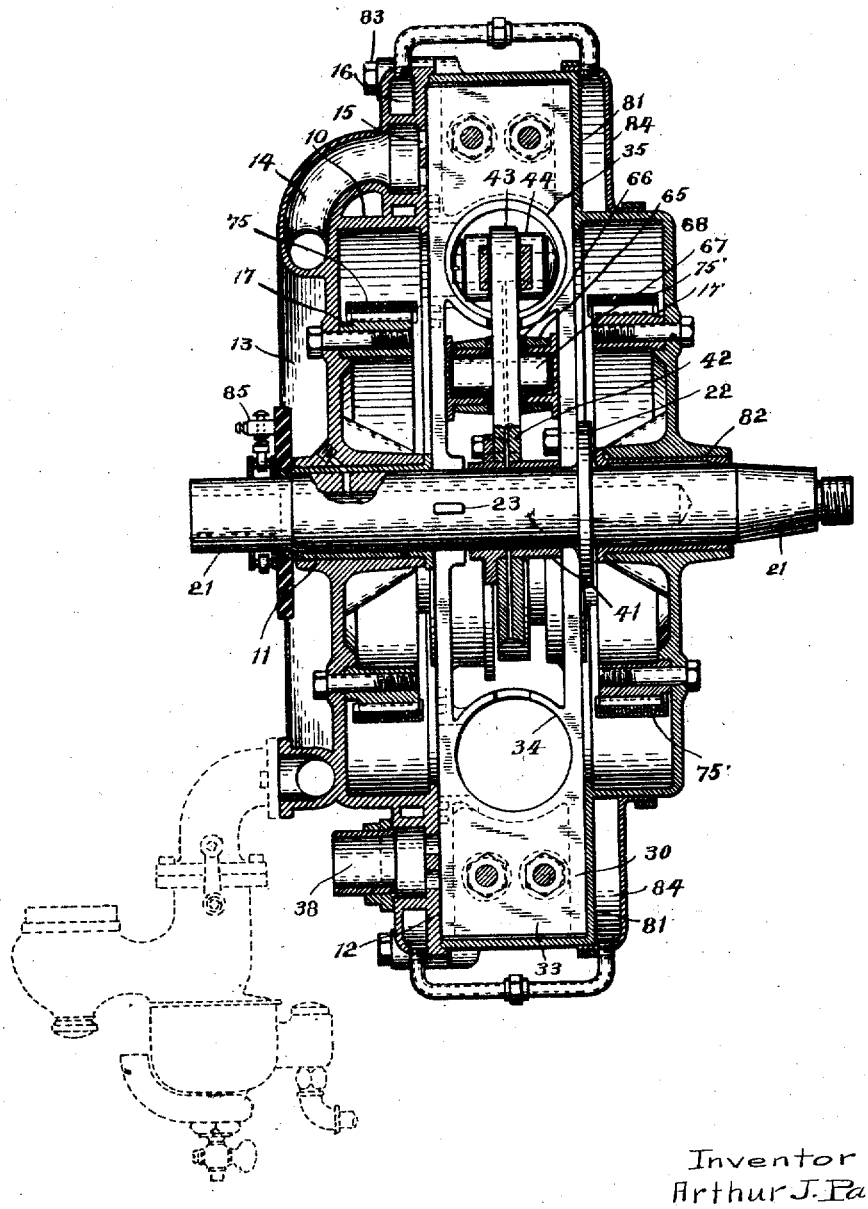
Figure 3:
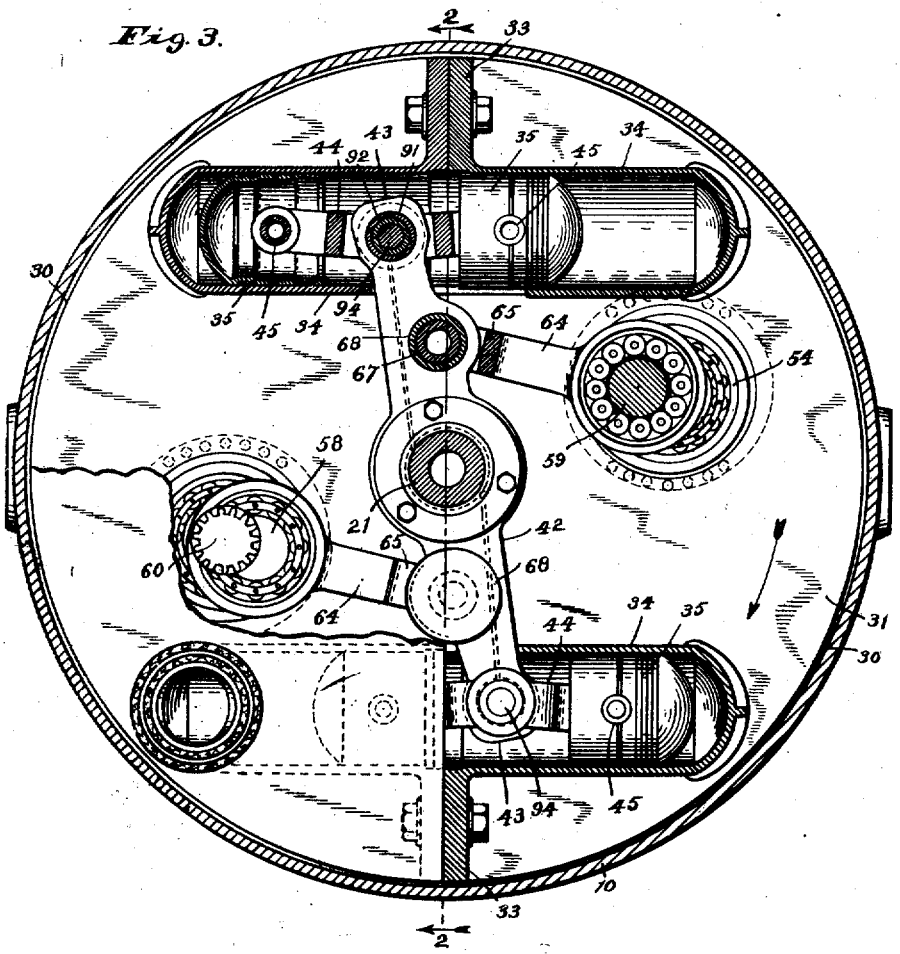
Figure 9:
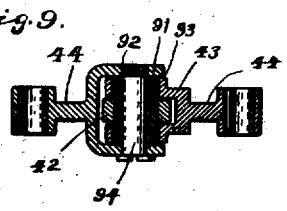
Figure 4:
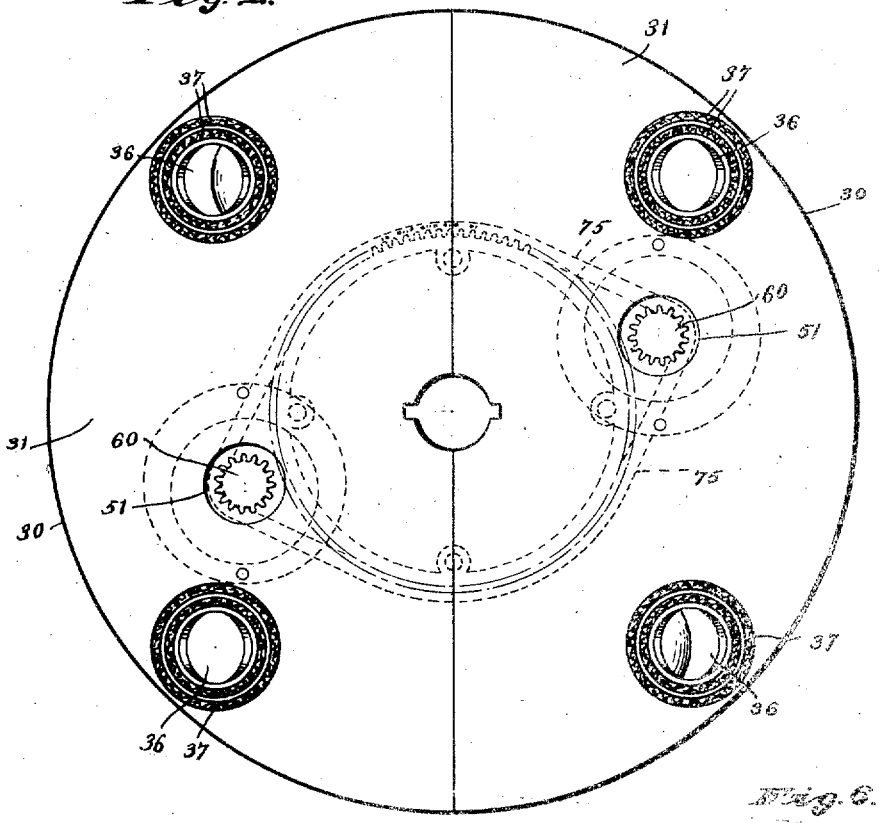
Figure 5:
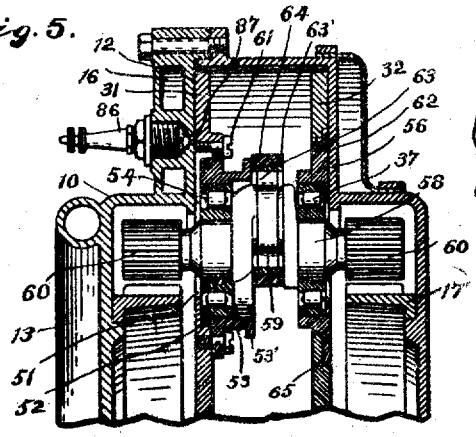
Figure 6:
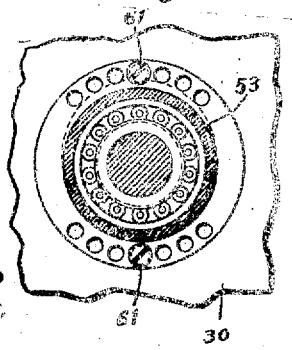
Figure 7:
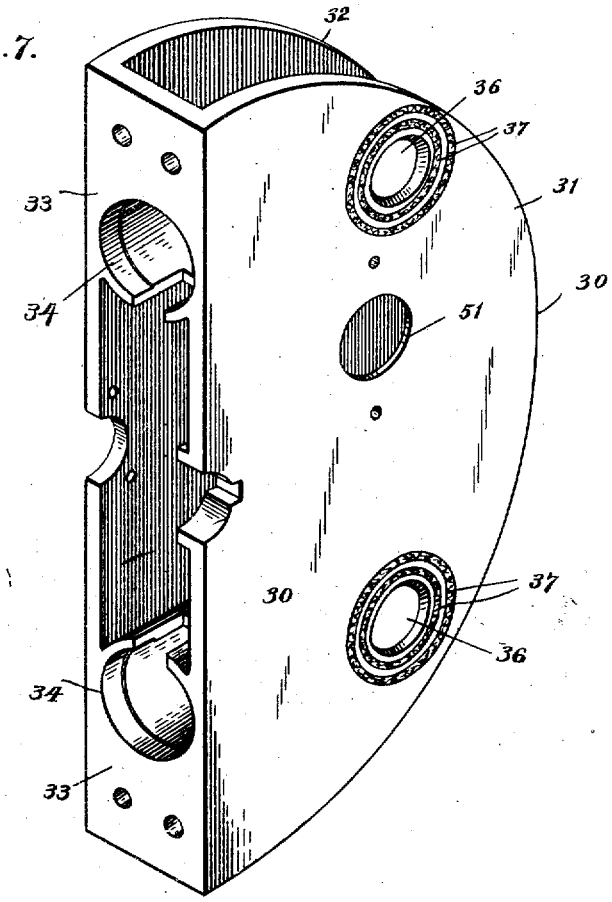

The accompanying drawings illustrate my invention. Figure 1 is an elevation of the inlet-and-exhaust side of an engine embodying my invention, one of the exhaust connections having been removed; Fig. 2 is an axial section through such engine on the line 2—2 of Fig. 3, the lower piston having been removed and the connecting arm broken away; Fig. 3 is a mid-cylinder section at right angles to the plane of Fig. 2, with some departures from the general sectional plane, the planetary element in the lower lefthand part being shown in full lines, and therefore departing from the main sectional plane, and the extreme lower lefthand portion displaying the port face of the rotary cylinder-body and thereby further departing from the main sectional plane in a direction toward the observer; Fig. 4 is an elevation of the port face of the rotary cylinder-body; Fig. 5 is a fragmentary section through the axis of one of the planetary elements with chain 75 omitted; Fig. 6 is a fragmentary elevation of the mounting of one of the supporting bearings for one of the planetary crank shafts; Fig. 7 is a perspective of one half of the rotary cylinder-body; Fig. 8 is a fragmentary section showing the packing rings surrounding the passage which affords communication to and from a combustion chamber or cylinder; and Fig. 9 is a fragmentary section of the connection between the pitmen of a pair of pistons and the main lever arm.

In the drawings, 10 indicates a body member, conveniently a casting, provided with a central bearing 11 and an annular working face 12 which lies at right angles to the axis of bearing 11. Casting 10 conveniently has formed integral with it an inlet manifold 13 provided, in the present form shown, with three branches 14, each of which communicates with an adjacent set of bridged ports 15, formed through the working face 12. Casting 10 may also have formed integral therewith a water chamber 16 which lies against the wall of the casting which forms the working face 12. Bolted or otherwise secured to body 10 concentric with bearing 11 is a sprocket 17. Journaled in bearing 11 is a main shaft 21 which is the power delivery shaft of the engine, and this shaft is provided with a circumferential flange 22 and with one or more keys 23.

In my former patent the pistons and associated cylinders traversed an annular stationary chamber which was concentric with the main shaft, while in the present construction instead of this annular chamber I provide a flat annular working face 12 and then provide what I call a rotary cylinder-body which is disk-like in form and is made up of two similar and mating castings 30, 30. As is clearly shown in Fig. 7, each of these castings (and it will be here understood that the term "casting" is used in its broadest sense merely as a convenient form to indicate a single structure whether actually cast or otherwise produced) comprises a semi-circular plate 31, a similar semi-circular plate 32 spaced from plate 31 but parallel with it, an intermediate and connecting plate or plates 33, and cylinders 34, 34 which lie between the semi-circular disks 31 and 32. The cylinders 34, 34 are so bored as to come into alined pairs with adjacent open ends when the two parts of the rotary cylinder-body are bolted together, as is shown in Fig. 3, and mounted in each of these cylinders is a piston 35. Each cylinder is provided with an inlet-and-exhaust port 36 which extends through the plate 31, and each of these ports, in the outer face of plate 31, is packed by packing rings 37 which are preferably arranged in two or more concentric series, and this outer face of the two plates 31 together with the packing rings 37, is formed to contact and cooperate with the working face 12 when shaft 21 is projected into bearing 11, and the ports 36 are so arranged that each successively comes into registry with the several sets of ports 15, registering alternately with a set of inlet ports 15 and one of several sets of bridged exhaust ports 38 which are also formed through the working face 12 at proper points between the inlet ports.

Journaled upon shaft 21 between flange 22 and keys 23 is a bushing 41 upon which is secured the main lever arm 42 having oppositely projecting ends 43, 43, and pivotally connected to each of these ends 43 is a pair of oppositely extending pitmen 44, each of which extends to and is pivoted upon a suitable cross pin 45 carried by one of the pistons 35.

Each plate 31 is perforated at 51, and surrounding this perforation is a pocket 52 in which is mounted a rotary bearing pocket 53 which carries a bearing 54 which is eccentric to the main body of the carrier 53. In axial alinement, or thereabout, with the perforation 51 is a perforation or pocket 55 which extends through plate 52, and in this pocket is mounted a bearing carrier 56 which carries a bearing 57 which is eccentric to the main body of the carrier. The arrangement of the two bearing carriers 53 and 56 is such that the bearings 54 and 57 will be in axial alinement, and by rotation of the bearing carriers the common axis of the two bearings 54 and 57 may be shifted toward and from the axis of the main shaft 21. The crank shaft 58 is provided with a medial cranked portion 59, and at its ends is provided with spur pinion sprockets 60, 60, which, when the parts are assembled, lie on the planes of the sprocket 17 and a corresponding sprocket 17′ to which reference will be made later. Any suitable means, as, for instance, fastening screws 61 and 62 each extending through proper ones of a series of holes in the flange of its coöperating bearing carrier, may be provided for holding the bearing carriers 53 and 56 in their angular adjustment. The various parts are so proportioned, as is evident from Fig. 5, that in assembling them the bearing 63 is first built upon the cranked portion 59 of the crank shaft 58, and the crank shaft with this bearing on it is then threaded through the pocket 55 which is large enough to permit this with proper manipulation, and then through the eye in one end of an arm 64, the bearing 63 remaining in such eye and being held there by the flange 63′ and the arm connecting the cranked portion 57 with the remainder of the crank shaft 58. As the crank shaft is thus put in place, the pinion sprocket 60 and the lefthand end of the crank shaft 58 are also threaded through the bearing 54, bearing pocket 53, and perforation 51, and the rotary bearing pocket 53 is fastened in the desired position in the pocket 52 by its screw 61. The bearing pocket 53 has a flange 53′ which bears against a face of the arm 64 to prevent side play thereof. After the crank shaft is in place in the eye of the rod 64, the carrier 56 and bearing 57 can be slipped over sprocket 60 at the righthand end of the shaft (Fig. 5) and seated in the pocket 55. When the parts have been thus far assembled the other bifurcated end 65 of arm 64 is caused to straddle the adjacent portion of lever 42, and spacing washers 66 are inserted between the lever and the fingers of the part 65. Thereupon a pin 67 is inserted through one of these fingers and pressed into the lever 42, said pin being somewhat shorter than the distance between the inner faces of the two plates 31 and 32 of the rotating cylinder-body. When this has been accomplished, two bushings 68, 68 are inserted in the fingers of the yoke 65 and sleeved over the pin 67, said bushings being so proportioned that when in place the distance between their outer vertical faces will be exactly equal save for a clearance space, to the distance between the inner faces of the plates 31 and 32 thus giving the lever 42 lateral bearing support.

The adjacent ends of each pair of pitmen 44 are pivotally attached to the ends 43 of the lever 42, as shown in Fig. 9. These ends of the two pitmen 44 are bifurcated, the one to the right in Fig. 9 spanning the ends 43 of the lever 42, and the one to the left spanning the bifurcated end of the one to the right. A steel sleeve 91 of the same length as the width of the bifurcated end of the pitman 44 to the right is located in the eye at the end of the lever 42, and has an enlarged portion having a tight fit in such eye. A bronze sleeve 92 has a loose fit within the steel sleeve 91, and is of the same length as the latter. Each prong of the bifurcated end of the pitman 44 at the right is perforated by an eye slightly larger than the middle enlarged portion of the steel sleeve 91, to allow the ready passage of the latter into place, and in each such eye is a bronze bushing 93, which has a sliding fit on the end of the steel sleeve 91 and a tight fit in such eye. A pin 94 extends through the inside of the bronze sleeve 92 and through the two prongs of the bifurcated end of the pitman 44 to the left, one of such prongs being suitably threaded so that such pin may be retained in place. Thus the pitman 44 to the left is provided with a bearing on the inside of the steel sleeve 91, and the pitman 44 to the right with a bearing on the outside of such sleeve.

The packing rings 37 are split and on their under faces are outwardly beveled as indicated at 71 (Fig. 8) and so proportioned as to fit snugly against the external wall of the pocket 72. Coöperating with the beveled face of the ring 37 is an oppositely beveled outer face of a ring 73 which is also seated in the pocket 72 and lies against its bottom. This ring 73 is also split and circumferentially compressed, so that by its radial expansion it will serve to urge the coöperating ring 37 outwardly at right angles to the working face of the plate 31 and into engagement with the working face 12 of the casing member 10.

When the parts carried by the shaft 21 have been assembled in the manner described, the shaft is projected through bearing 11 and a chain 75 is mounted upon the fixed sprocket wheel 17 and upon the two now adjacent sprocket pinions 60, which lie free from the teeth of the sprocket wheel 17. This brings the working face of plate 31 into engagement with the working face 12, and thereupon a casing member 81, which is provided with a bearing 82, is slipped over the rotary cylinder-body and the shaft, coming into contact with the working face of plate 32 (not for the purpose of making a gas-tight joint, but in order to hold the parts in proper relation with each other), inclosing the rotary cylinder-body and being attached to the main body casting 10 by suitable bolts 83. This body member 81 may be a casting or steel stamping, and carried within it is a sprocket wheel 17′ which is concentric with the bearing 82 and is like the sprocket wheel 17, being formed to receive a chain 75′ like the chain 75; for cooperation with the adjacent pinion sprocket 60 of the planetary crank shafts.

A portion of the main plate of this body member 81 may be water-jacketed as indicated at 84.

In operation, the fuel cycle is the ordinary Otto cycle and the ports of the several cylinders come alternately into registry with the several inlet and exhaust ports, the direction of rotation being indicated by the arrow in Fig. 3 and a complete cycle being performed during one-third of a rotation of the cylinder-body. Force applied by pressure exerted upon any piston, tends to swing lever 42 upon shaft 21. This in turn exerts a force, either a pull or a push depending upon which piston is being acted upon, upon the arms 64, which, in turn, act upon the planetary crank shafts 58 so as to produce rotation thereof. Rotation of these crank shafts causes the pinion sprockets 60 to rotate within the chains 75, and, as these chains are held by the fixed gears 17 and 17′, the resultant force upon the planetary shafts is circumferential relative to the axis of shaft 21, and, as the casing 10—84 is held against rotation at the supporting points, S, S (Fig. 1), rotation of shaft 21 is produced. In the form shown in the drawings, the engine is of the internal combustion type, and therefore, as one way of illustrating this, the shaft 21 is shown as provided with a suitable sparking current distributer 85 (Figs. 1 and 2) and spark plugs 86 are provided at suitable points, each of said spark plugs communicating through a suitable port 87 at proper times with the ports 36 of the several cylinders.

It will be readily apparent to any engineer that the precise method of induction and eduction of motive fluid to the cylinders is not important, and that modifications to adapt the structure to any particular motive fluid desired may be accomplished without difficulty. In using the term "gear" in the claims, I intend to include both toothed and untoothed members, whether acting on one another directly or through the medium of a chain or belt.

As indicated in Fig. 4, the chain 75 is of the so-called "silent" type and in practice a connection of this kind between the central gear and the planetary gears is preferable to a direct gear connection because in any direct gear connection there is some back-lash which increases as the parts wear. Where the connection is a silent chain, however, there is a progressive engagement between the chain and the gears, which eliminates the back-lash and thus produces a very steady running machine.

I claim as my invention:

1. In an engine, the combination of a shaft, a cylinder-body carried by said shaft and provided with cylinders, each of the cylinders of the cylinder-body being arranged tangentially relative to the axis of the cylinder body and ported in its side for the induction and eduction of motive fluid, pistons mounted in the cylinders of said cylinder-body, one or more crank shafts journaled in the cylinder-body and each provided with a gear, intermediate driving connections between the pistons and the crank shafts, a casing inclosing the cylinder-body and having laterally presented inlet and exhaust ports for successive registry with the cylinder ports, a gear carried by the casing member, and intermediate connections between said last named gear and the crank shaft gear.

2. In an engine, a shaft and a casing associated for relative rotation, said casing having an annular ported working face concentric with the shaft, a cylinder-body carried by said shaft and carrying a plurality of cylinders, said cylinder-body having a working face coöperating with the ported face of the casing and ported into the cylinders, said cylinder-body comprising members mating on planes substantially parallel to the shaft and at an angle to the axes of the cylinders, pistons mounted in the cylinders, a lever connected with one or more pistons, a crank shaft journaled in the cylinder-body, a gear carried by the casing, intermediate rolling connections between said gear and the crank shaft, and connections between the lever and crank shaft.

3. In an engine, a shaft and a casing associated for relative rotation, said casing having an annular ported working face concentric with the shaft and in a plane at an angle to the axis of the shaft, a cylinder-body carried by said shaft and carrying a plurality of cylinders, said cylinder-body having a working face coöperating with the ported face of the casing and ported into the cylinders, pistons mounted in the cylinders, a lever connected with one or more pistons, a crank shaft journaled in the cylinder-body, a gear carried by the casing, intermediate rolling connections between said gear and the crank shaft, and connections between the lever and crank shaft.

4. In an engine, a shaft and casing associated for relative rotation, said casing having an annular ported working face concentric with the shaft, a cylinder-body carried by said shaft, said cylinder-body comprising a pair of mating members each comprising two segmental plates extending around the axis of the shaft and an intermediate plate in a plane substantially parallel with said axis and mating with a corresponding plate of the other member, cylinders carried by the cylinder-body and each having one end opening through the intermediate plate and being ported through one of the segmental plates to successively register with the ports of the casing, pistons mounted in said cylinders, one or more crank shafts journaled in the cylinder-body, a gear carried by the casing, intermediate connections between the pistons and the crank shafts, and intermediate connections between the crank shafts and the gear.

5. In an engine, a shaft and casing associated for relative rotation, said casing having an annular ported working face concentric with the shaft, a cylinder-body carried by said shaft, said cylinder-body comprising a pair of mating members each comprising two segmental plates extending around the axis of the shaft and an intermediate plate in a plane substantially parallel with said axis and mating with a corresponding plate of the other member, cylinders carried by the cylinder-body and each having one end opening through the intermediate plate and being ported through one of the segmental plates to successively register with the ports of the casing, pistons mounted in said cylinders, one or more crank shafts journaled in the cylinder-body, a gear carried by the casing, a lever journaled upon the shaft, connections between the ends of this lever and the pistons, and a connection between each crank shaft and the lever, said connection comprising a pitman having a yoked end straddling the lever, a pin projected through the lever and said yoked end, and bushings sleeved over said pin and into the yoked end of the pitman, said bushings at their ends engaging the inner faces of the segmental plates.

6. In an engine, the combination of a shaft, a cylinder-body carried by said shaft and provided with cylinders, each of the cylinders of the cylinder-body being arranged tangentially relative to the axis of the cylinder body and ported in its side for the induction and eduction of motive fluid, pistons mounted in the cylinders of said cylinder-body, one or more crank shafts journaled in the cylinder-body and each provided with means for transmitting its rotary movement, intermediate driving connections between the pistons and the crank shafts, a casing inclosing the cylinder-body and having laterally presented inlet and exhaust ports for successive registry with the cylinder ports, and connections between said casing and the crank shafts.

7. In an engine, the combination of a shaft, a cylinder-body comprising two mating members, each of said members carrying two cylinders upon opposite sides of the axis of the body with their axes tangential relative to the axis of the cylinder-body and said cylinders being so arranged that two cylinders of each mating member may be brought into association with two cylinders of the other mating member in a balanced relationship relative to the axis of the shaft, an arm fulcrumed about the axis of said shaft, pistons mounted in each mating pair of cylinders, the two pairs of pistons being connected in balanced relationship to the opposite ends of said fulcrumed arm, two planetary crank shafts journaled in the cylinder-body, two pitmen connecting said crank shafts to opposite arms of the fulcrumed arm, and driving connections between said planetary crank shafts and the casing.

8. In an engine, the combination of a shaft, a cylinder-body comprising two mating members, each of said members carrying two cylinders upon opposite sides of the axis of the body with their axes tangential relative to the axis of the cylinder-body and said cylinders being so arranged that two cylinders of each mating member may be brought into association with two cylinders of the other mating member in a balanced relationship relative to the axis of the shaft, pistons in said cylinders, and intermediate driving connections between said pistons and shaft.

ARTHUR J. PAIGE.